(12) United States Patent
Tabet et al.

(10) Patent No.: US 9,374,259 B2
(45) Date of Patent: Jun. 21, 2016

(54) PHYSICAL DOWNLINK CONTROL CHANNEL DECODING

(71) Applicant: Apple Inc., Cupertino, CA (US)

(72) Inventors: Tarik Tabet, San Jose, CA (US); Navid Damji, Cupertino, CA (US); Syed A. Mujtaba, Santa Clara, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/497,071

(22) Filed: Sep. 25, 2014

(65) Prior Publication Data

US 2015/0092893 A1 Apr. 2, 2015

Related U.S. Application Data

(60) Provisional application No. 61/884,246, filed on Sep. 30, 2013.

(51) Int. Cl.
*H04L 27/06* (2006.01)
*H04L 27/26* (2006.01)
*H04L 5/00* (2006.01)
*H04W 52/02* (2009.01)

(52) U.S. Cl.
CPC .......... *H04L 27/2649* (2013.01); *H04L 5/0005* (2013.01); *H04L 5/0053* (2013.01); *H04W 52/0209* (2013.01); *Y02B 60/50* (2013.01)

(58) Field of Classification Search
CPC . H04L 25/067; H04L 1/0045; H04L 27/2647; H04L 1/005; H04L 1/0054; H04L 5/0007; H04W 28/04; H04W 72/04; H04W 72/042; H04W 88/08
USPC .......................... 375/340, 316, 219; 370/329
See application file for complete search history.

(56) References Cited

U.S. PATENT DOCUMENTS

| | | | |
|---|---|---|---|
| 2012/0281640 A1* | 11/2012 | Xu ........................ | H04L 5/0048 370/329 |
| 2013/0188577 A1* | 7/2013 | Papasakellariou .... | H04W 72/04 370/329 |
| 2014/0219212 A1* | 8/2014 | Seo ........................ | H04B 7/155 370/329 |

* cited by examiner

*Primary Examiner* — Zewdu Kassa
(74) *Attorney, Agent, or Firm* — Downey Brand LLP

(57) ABSTRACT

Methods and apparatuses to reduce resource consumption by a mobile wireless device when decoding control channel information, such as a physical downlink control channel (PDCCH), in a subframe received from an LTE wireless network are disclosed. Representative methods include demodulating a first set of one or more PDCCH OFDM symbols contained in the subframe based on a first channel estimate; obtaining a second channel estimate based on a second OFDM symbol before demodulating a second set of one or more PDCCH OFDM symbols contained in the subframe based on both the first channel estimate and the second channel estimate. When the PDCCH indicates no downlink assignments for the subframe, the mobile wireless device enters a reduced power consumption mode after demodulating the PDCCH.

20 Claims, 13 Drawing Sheets

PHYSICAL DOWNLINK CONTROL CHANNEL DECODING

CROSS REFERENCE TO RELATED APPLICATIONS

This application claims the benefit of U.S. Provisional Application No. 61/884,246, filed Sep. 30, 2013 and entitled "PHYSICAL DOWNLINK CONTROL CHANNEL DECODING", which is incorporated by reference herein in its entirety for all purposes.

FIELD

The described embodiments relate generally to wireless communications and more particularly to reducing resource consumption when decoding a physical downlink control channel (PDCCH).

BACKGROUND

Fourth generation (4G) cellular networks employing newer radio access technology (RAT) systems that implement the $3^{rd}$ Generation Partnership Project (3GPP) Long Term Evolution (LTE) and LTE Advanced (LTE-A) standards are rapidly being developed and deployed within the United States and abroad. In many wireless communication networks, including networks implementing LTE and LTE-A radio access technologies (RATs), wireless communication devices decode control information of various wide-band communication channels, such as the physical downlink control channel (PDCCH) that is communicated using particular orthogonal frequency-division multiplexing (OFDM) symbols within each subframe of a transmission frame. Control information carried in the PDCCH is referred to as downlink control information (DCI). The DCI may include downlink (DL) grant/assignment information (e.g., resource allocations for the physical downlink shared channel or PDSCH), uplink (UL) resource grant/assignment information (e.g., resource allocations for the physical uplink shared channel or PUSCH), transmit power control information, and/or other types of DCI. An LTE or LTE-A base station may designate a PDCCH format according to its DCI information, which can be directed at a single wireless communication device or to multiple wireless communication devices located within the same cell. For instance, PDCCH DCI may be associated with a cell radio network temporary identifier (C-RNTI) directed at a single wireless communication device, or alternatively, PDCCH DCI may be associated with a paging RNTI (P-RNTI) or a system RNTI (S-RNTI) directed at a group of wireless communication devices located within the same cell.

LTE carriers often require a wireless communication device to perform blind decoding of the PDCCH to attempt to locate DCI intended for the wireless communication device (e.g., for the specific wireless communication device and/or for a group of wireless communication devices operating within the same network cell, the group including the wireless communication device), such as may be indicated by an RNTI designation. For example, a wireless communication device may be required to perform blind decoding in scenarios where the wireless communication device is unaware of a carrier's particular PDCCH control channel structure. The PDCCH control channel structure can include a particular number of PDCCH control channels and a number of control channel elements (CCEs) to which each control channel is mapped. Blind decoding of the PDCCH by a wireless communication device can be particularly costly in terms of the consumption of device resources, such as battery power, processor and memory resources, and the like. This resource consumption by the wireless communication device can be particularly costly when the device performs unnecessary PDCCH searches and/or when the PDCCH otherwise does not include a downlink assignment for the wireless communication device, particularly when the device is engaged in low-bandwidth, periodic communications, such as voice over LTE (VoLTE) communications that could otherwise allow the device to operate in a reduced power consumption state (e.g., in a sleep mode). In this regard, not only does the blind decoding of the PDCCH itself consume resources, but the time required to adapt physical layer processes, such as channel estimation, time tracking, and frequency tracking, used to support PDCCH decoding can impact the amount of time that the device performs hardware/software processing during PDCCH monitoring. Therefore, improvements to parallelize adaptive physical layer processes with PDCCH decoding to provide for the device to enter more quickly a reduced power consumption state between PDCCH decoding periods are desired.

SUMMARY

Wireless communication devices use a variety of adaptive physical (PHY) layer loops, e.g., a channel estimation (CE) loop, a Frequency Tracking Loop (FTL), a Time Tracking Loop (TTL), a Doppler loop, etc., to process and correctly demodulate a received signal transmitted by a serving base station of a wireless network. These PHY layer loops use reference signal (RS) resource elements contained particular symbols of the received signal. Control channel information, such as a physical downlink control channel (PDCCH), received by a wireless communication device and positioned at the beginning of a subframe indicates whether any assignments (or grants) are assigned (or allocated) to the wireless communication device in the remainder of the subframe. When no assignments are assigned, the wireless communication device enters a power-reduced state for the remainder of the subframe. More rapid adaption of the PHY layer loops in parallel with decoding of the PDCCH reduces power consumption by the wireless communication device, because a power-reduced state is entered more quickly.

Adaptive physical layer loops require a level of accuracy in order to demodulate received signals. The wireless communication device balances a convergence time for the adaptive loops with an accuracy level required to ensure stability and also to reduce power consumption. To reduce a total time to adapt the physical layer loops and complete decoding of control channel signals, without sacrificing performance, the wireless communication device adjusts a time for channel estimation based on a number of symbols of the subframe that carry control channel information. In some embodiments, the wireless communication device performs at least a part of channel estimation in parallel with control channel decoding to minimize the total time to complete control channel decoding. Each subframe uses a number of symbols to carry control channel information. When the control channel information of the subframe is carried in only one symbol, channel estimation is performed using a first symbol of the subframe that carries RS resource elements to generate a first channel estimate, and the control channel information is demodulated using the first channel estimate alone or in combination with channel estimates from a previous subframe. When the control channel information of the subframe is carried in more than one symbol, a first channel estimate is obtained based on the first symbol that includes RS resource elements, the first symbol is demodulated based on the first channel estimate (and in some embodiments also based on one or more channel estimates from one or more previous subframes) and a second channel estimate is obtained based on a second symbol of the subframe that includes RS resource elements.

In some embodiments, the second channel estimate is obtained in parallel with demodulation of the first symbol, which also contains control information, based on the first channel estimate. In some embodiments, the second symbol that includes RS resource elements used for channel estimation is separated from the first symbol by at least one intervening symbol, e.g. two or three intervening symbols depending on a structure for symbols of the subframe. One or more of the intervening symbols between the first and second symbols that include RS resource elements are demodulated based on the first channel estimate or on a combination of the first channel estimate and the second channel estimate. In some embodiments, the second channel estimate is obtained in parallel with demodulation of one or more of the intervening symbols, at least some of which can include control channel information, based on the first channel estimate, thus parallelizing demodulation of symbols that include control channel information with channel estimation to reduce a time to complete channel estimation and demodulation of control channel information while maintaining acceptable demodulation performance and accuracy. The wireless communication device balances using channel estimates from fewer (and earlier occurring) symbols that include RS resource elements to reduce demodulation time of earlier occurring symbols of a subframe and including channel estimates from more (later occurring) symbols that include RS resource elements to increase accuracy for demodulation of later occurring symbols of the subframe.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
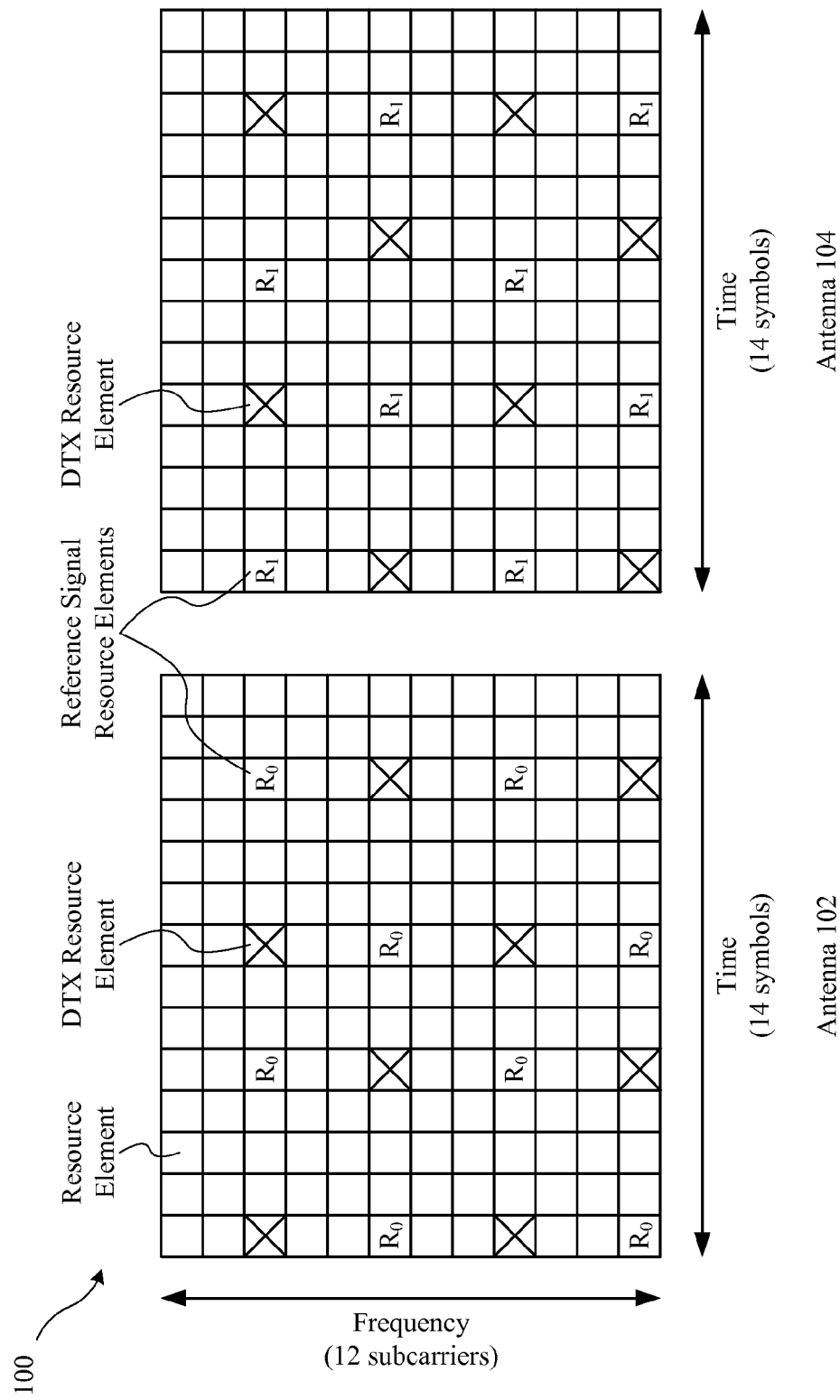
FIG. 1 illustrates an example reference signal (RS) resource block structure for LTE when using two antennas, in accordance with some embodiments.

In LTE and other wireless systems, wireless communication devices use a variety of physical (PHY) layer loops to process and correctly demodulate a received signal transmitted by a serving base station of a wireless network. For example, these PHY layer loops can include a channel estimation (CE) loop, a Frequency Tracking Loop (FTL), a Time Tracking Loop (TTL), a Doppler loop, and/or the like. These PHY layer loops can be based on processing of reference signal (RS) resource elements contained in the received signal. Wireless systems provide opportunities for power reduction by using a discontinuous reception (DRX) mode when traffic activity is low, occurs in bursts, or is periodic, such as in a voice over LTE (VoLTE) connection. Control channel information, such as a physical downlink control channel (PDCCH), received by a wireless communication device from a wireless network at the beginning of a subframe can indicate whether assignments (or grants) are assigned (or allocated) to the wireless communication device in the remainder of the subframe. When no grants/assignments are provided, the wireless communication device can enter a power-reduced state for the remainder of the subframe. Thus, rapid decoding of the PDCCH can reduce power consumption by the wireless communication device, as the power-reduced state can be entered more quickly.

The adaptive physical layer loops, however, can require particular level of accuracy to demodulate signals, and thus the wireless communication device can balance between convergence and accuracy to ensure stability and also reduce power consumption. A convergence rate of channel estimation and other physical layer loop algorithms can determine an amount of time that the wireless communication device actively performs signal processing during monitoring and decoding of control channel signals for a portion of a subframe. To reduce a total time to complete decoding of the control channel signals, without sacrificing performance, the wireless communication device adjusts a time for channel estimation based on a number of symbols that carry control channel information for a subframe. Each subframe can use a different number of symbols to carry control channel information. When the control channel information is carried in one symbol for the subframe, channel estimation is performed using a first symbol of the subframe that carries RS resource elements to generate a first channel estimate, and the control channel information is demodulated using the first channel estimate alone or in combination with channel estimates from a previous subframe. When the control channel information is carried in more than one symbol for the subframe, a first channel estimate is obtained based on the first symbol that includes RS resource elements, the first symbol is demodulated based on the first channel estimate (and in some embodiments also based on one or more channel estimates from a previous subframe) and a second channel estimate is obtained based on a second symbol that includes RS resource elements, the second symbol being separated from the first symbol by at least one intervening symbol. In some embodiments, the second symbol that includes RS resource elements is separated from the first symbol that includes RS resource elements by two or three intervening symbols, e.g., a first symbol labeled symbol #0 and a second symbol labeled as symbol #4 (when a normal cyclic prefix is used and each time slot includes seven OFDM symbols) or labeled as symbol #3 (when an extended cyclic prefix is used and each time slot includes six OFDM symbols) of the subframe. One or more of the at least one intervening symbol(s) between the first and second symbols that include RS resource elements can be demodulated based on the first channel estimate or on a combination of the first channel estimate and the second channel estimate. In some embodiments, the second channel estimate can be obtained in parallel with demodulation of one or more of the intervening symbols, at least some of which can include control channel information, based on the first channel estimate, thus parallelizing demodulation of symbols that include control channel information with channel estimation to reduce a time to complete channel estimation and demodulation of control channel information while maintaining acceptable demodulation performance and accuracy. The wireless communication device can balance using channel estimates from fewer (and earlier occurring) symbols that include RS resource elements to reduce demodulation time of earlier occurring symbols of a subframe and including channel estimates from more (later occurring) symbols that include RS resource elements to increase accuracy for demodulation of later occurring symbols of the subframe.

FIG. 1 illustrates a diagram 100 of a representative structure for resource blocks that includes reference signals in particular resource elements of OFDM symbols for a wireless communication device operating in accordance with an LTE wireless communication protocol when using two antennas. More particularly, FIG. 1 illustrates an example RS resource element symbol structure for a wireless communication device using two antennas to communicate with an LTE wireless network. The use of multiple antennas for communication between a wireless communication device and a serving wireless network can be referred to as multiple-input multiple-output (MIMO) communication. A resource block for a first antenna 102 includes eight resource elements that include reference signals $R_0$, while a resource block for a second antenna 104 (used at the same time as the first antenna 102) includes eight additional resource elements that include reference signals $R_1$ assigned to a different resource elements than the reference signals $R_0$ used for the resource block for the first antenna 102. Each column of a resource block represents an orthogonal frequency-division multiplexing (OFDM) symbol, while each row of a resource block represents respective frequency ranges (e.g., subcarriers). If a particular OFDM symbol is labeled as "l", while a particular subcarrier is labeled as "k", then the pair (k,l) can represent a particular resource element (RE) that carries information using subcarrier "k" during OFDM symbol "l". Resource elements that include RS symbols for Antenna 102 may be represented as $R_0$, while resource elements that include RS symbols for Antenna 104 may be represented as $R_1$. As may be seen from FIG. 1, the RS symbols for Antenna 102 and Antenna 104 may be assigned to distinct resource elements such that resource elements used for transmission of RS symbols for Antenna 102 are not used for transmission for Antenna 104, and vice versa. Thus, resource elements that carry RS symbols for one antenna are reserved as discontinuous transmission (DTX) resource elements for other antennas used in parallel on the same OFDM symbol and frequency subcarrier to avoid interference between antennas for the RS symbols.

It will be appreciated that the example RS symbol structure illustrated in FIG. 1 is provided by way of example, and not by way of limitation. In this regard, the example structure can be extended to devices that implement MIMO techniques and use more than two antennas for communication with a serving wireless network. Also, it will be appreciated that a similar RS symbol structure may be used for transmission with respect to devices that use only a single antenna for communication with the serving network. For example, the RS symbol structure for antenna 102 may be used with $R_1$ symbols being omitted from the shared resource space permitting use of the DTX resource elements for antenna 102 to carry data.

A wireless communication device can perform channel estimation based at least in part on a set of RS symbols included in one or more OFDM symbols of a subframe in OFDM systems, such as LTE systems, including both LTE and LTE-A RATs. Channel estimation algorithms for OFDM systems include two components: frequency domain tracking/interpolation and time domain channel tracking/interpolation. Frequency domain tracking/interpolation is used to find channel estimates for subcarriers that do not contain reference symbols (also referred to as pilots) and to smooth noise in the frequency domain. Frequency domain tracking/interpolation can, for example, be achieved through filtering in the frequency domain and/or through windowing in the time domain. Time domain tracking/interpolation is used to interpolate channel estimates for OFDM symbols that do not contain reference symbols and to smooth the channel in the time domain direction. A time tracking filter can depend on noise estimates and/or on Doppler estimates.

Estimates of a channel response, such as may be performed based on RS symbols, may be used for demodulation of information, such as DCI carried in an OFDM symbol. In this regard, channel estimates can be used to demodulate OFDM symbols including PDCCH (e.g., PDCCH OFDM symbols) to extract DCI carried by the PDCCH OFDM symbols. The DCI can include DL resource assignments and/or other DL control information for a wireless communication device or for a group of wireless communication devices. As such, a wireless communication device operating in an LTE system may decode the PDCCH to determine whether any DL resource assignments are assigned to the device.

The PDCCH control channel may be included in a DL subframe of a DL frame. A wireless communication device operating in a radio resource control (RRC) connected mode can decode the PDCCH in every subframe in which the PDCCH is present to determine whether an assignment is scheduled for the device. The PDCCH may be included in the first OFDM symbol or in a first set of OFDM symbols of a DL subframe within a DL frame.

Figure 2:
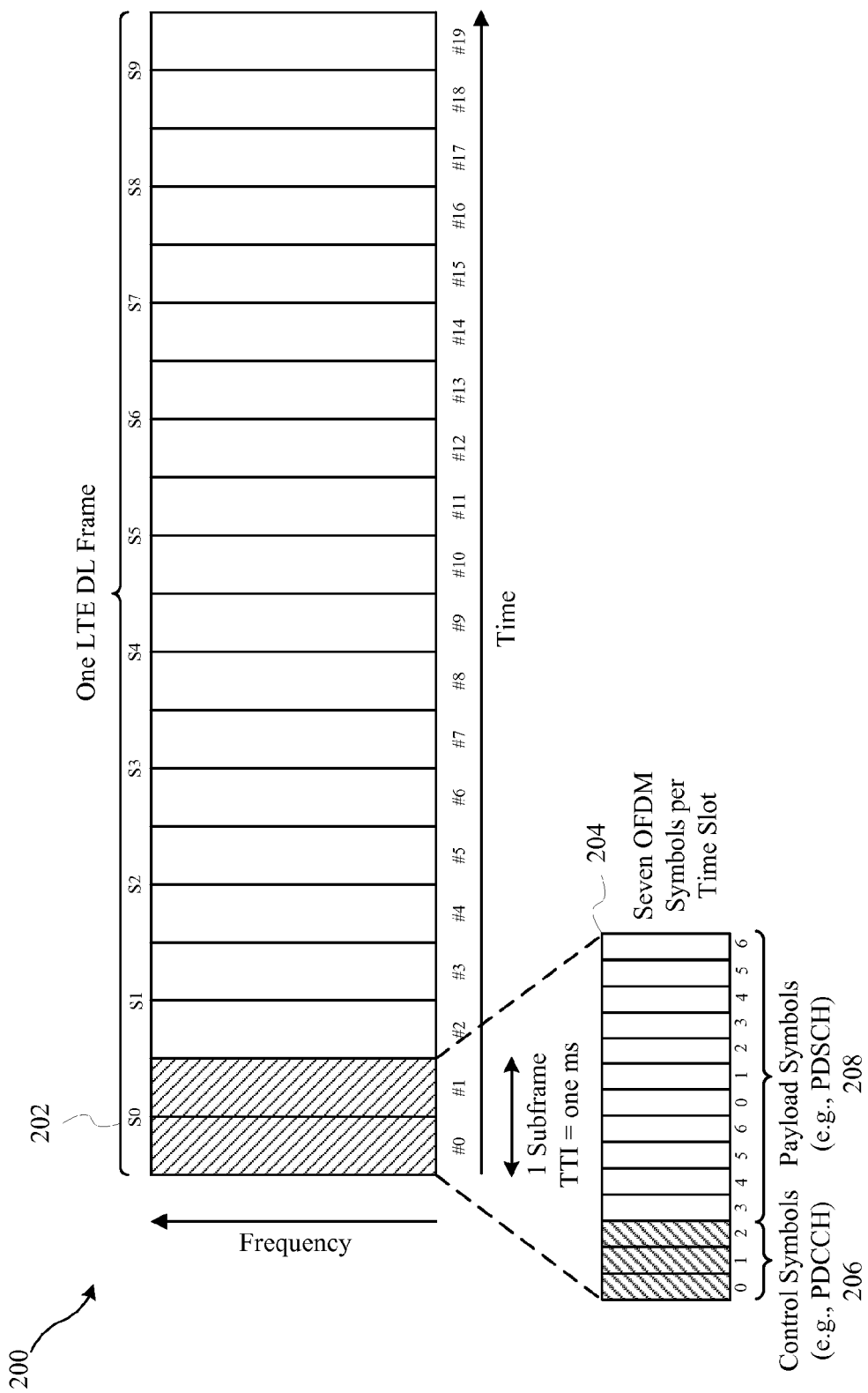
FIG. 2 illustrates an LTE downlink (DL) data frame structure, in accordance with some embodiments.

FIG. 2 illustrates a diagram 200 of an LTE DL data frame structure for an LTE DL data frame 202 that can be received by a wireless communication device operating within an LTE system. The LTE DL data frame 202 includes the PDCCH within a set of control symbols 206 in a subframe of the data frame in accordance with some embodiments. The LTE DL data frame 202 can include ten consecutive subframes, labeled S0 through S9, respectively. Each subframe can occupy a transmission time interval (TTI) of one millisecond (ms). An LTE subframe can include two consecutive time slots, each time slot occupying a TTI of 0.5 ms. Accordingly, there can be twenty time slots, labeled #0 through #19, within each LTE DL data frame 202.

Each time slot can, for example, include seven OFDM symbols. A respective subframe, such as the first subframe 204, (labeled S0 and occupying time slots #0 and #1), of the LTE DL data frame 202 can include a total of fourteen OFDM symbols. In this regard, the S0 subframe 204 can include the seven OFDM symbols included in time slot #0 and the seven OFDM symbols included in time slot #1. It should be understood, however, that the structure of FIG. 2 is provided by way of example, and not by way of limitation. In this regard, while the example of FIG. 2 illustrates each subframe including fourteen OFDM symbols, the number of OFDM symbols in each of the LTE subframes, S0 through S9, can vary depending on a length of a corresponding cyclic prefix (CP). The CP can be transmitted before each OFDM symbol in each sub-carrier in the time domain to prevent inter-symbol interference (ISI) due to multipath.

A first portion of the OFDM symbols (e.g., the first three OFDM symbols) of the S0 subframe 204 may include control symbols 206 designated for control signaling information, such as DCI associated with the PDCCH. The remaining portion of the OFDM symbols of the S0 subframe 204 may include payload symbols 208 designated for payload data, such as payload data associated with the Physical Downlink Shared Channel (PDSCH).

In the example of FIG. 2, the S0 subframe 204 can include three PDCCH OFDM symbols. The number of PDCCH OFDM symbols, however, can vary from subframe to subframe. The number of PDCCH OFDM symbols included in a respective subframe can be indicated by a Control Format Indicator (CFI) value, which can be communicated on a physical control format indicator channel (PCFICH) included in the first OFDM symbol of the subframe (e.g., OFDM symbol #0 of the first time slot #0 of the subframe). In many LTE systems, there are generally between one and four PDCCH OFDM symbols in a subframe that contains the PDCCH. In some LTE deployments having a frequency band with a bandwidth greater than 1.8 MHz, such as for 10 MHz LTE deployments, CFI values of 0, 1, and 2 can respectively indicate that a subframe contains 1, 2, and 3 PDCCH OFDM symbols. In some LTE deployments having a frequency band with a bandwidth of 1.8 MHz or less, CFI values of 0, 1, and 2 can respectively indicate that a subframe contains 2, 3, and 4 PDCCH OFDM symbols.

As illustrated in FIG. 2, PDCCH OFDM symbols generally occupy the first portion of a subframe. In this regard, when a subframe contains n PDCCH OFDM symbols, the PDCCH OFDM symbols can occupy the first n OFDM symbols of the subframe. Thus, in the example of FIG. 2, in which the S0 subframe 204 contains three PDCCH OFDM symbols, those symbols occupy the first three OFDM symbols (e.g., OFDM symbols #0, #1, and #2 of time slot #0) of the S0 subframe 204.

When the PCFICH is not transmitted in a subframe, the subframe may be understood by a wireless communication device to not include the PDCCH. In subframes in which the PDCCH is not included, a wireless communication device can forego performing PDCCH decoding. For subframes that do include the PDCCH, however, a wireless communication device can perform PDCCH decoding (e.g., blind PDCCH decoding).

Some wireless communication systems, including LTE systems, exploit the concept of discontinuous reception (DRX) to provide power saving to wireless communication devices for time periods during which traffic activity is low, bursty, and/or periodic, such as can occur with voice over LTE (VoLTE) communications. In this regard, when a wireless communication device is not actively transmitting and has not received a DL assignment for a subframe, the wireless communication device, when implementing DRX, can enter a reduced power consumption state (e.g., go to sleep) for a portion of a subframe, such as the remainder of the subframe after determining that no UL transmission or DL reception will occur during the remainder of the subframe. As such, the amount of time during which a wireless communication device can operate in a reduced power consumption state (e.g., a sleep state) when there is no DL assignment (during which to receive DL transmission from the wireless network) or UL assignment (during which to transmit to the wireless network) can depend on the amount of time taken by the wireless communication device to decode the PDCCH in a subframe.

When a subframe includes only a single PDCCH OFDM symbol, a single channel estimate can be performed and used for demodulation of the PDCCH OFDM symbol without requiring any time tracking based on channel estimates across multiple OFDM symbols based on OFDM symbols that include RS signals. Thus, for example, a channel estimate can be performed based on RS signals included in OFDM symbol #0, which also includes the PDCCH, and the PDCCH can be demodulated as soon as the channel estimate is available, without waiting to perform channel estimates based on subsequent OFDM symbols that contains additional RS symbols.

When a subframe includes multiple PDCCH OFDM symbols, there is a tradeoff between a time for convergence of adaptive algorithms that use information in the multiple PDCCH OFDM symbols and an accuracy of results when decoding PDCCH. In this regard, a convergence rate of channel estimation and/or other physical layer loops can determine the amount of time a wireless communication device performs active hardware/software processing during PDCCH decoding, and thus can impact an amount of power consumed by the wireless communication device when performing PDCCH decoding. The convergence rate of channel estimation can impact power consumption by the wireless communication device because when no DL assignment is assigned to a wireless communication device, the wireless communication device can enter a reduced power consumption state (e.g., in accordance with DRX techniques) until the start of the next subframe after completing PDCCH processing, particularly when the device is engaged in low-bandwidth, periodic communications, such as voice over LTE (VoLTE) communications, and thus completing PDCCH processing quickly can save battery power. Efforts to reduce the convergence rate, however, can also reduce decoding accuracy. In this regard, some approaches to PDCCH decoding that seek to adjust PDCCH processing times can either suffer from a high convergence rate length or can result in poor accuracy.

Figure 3:
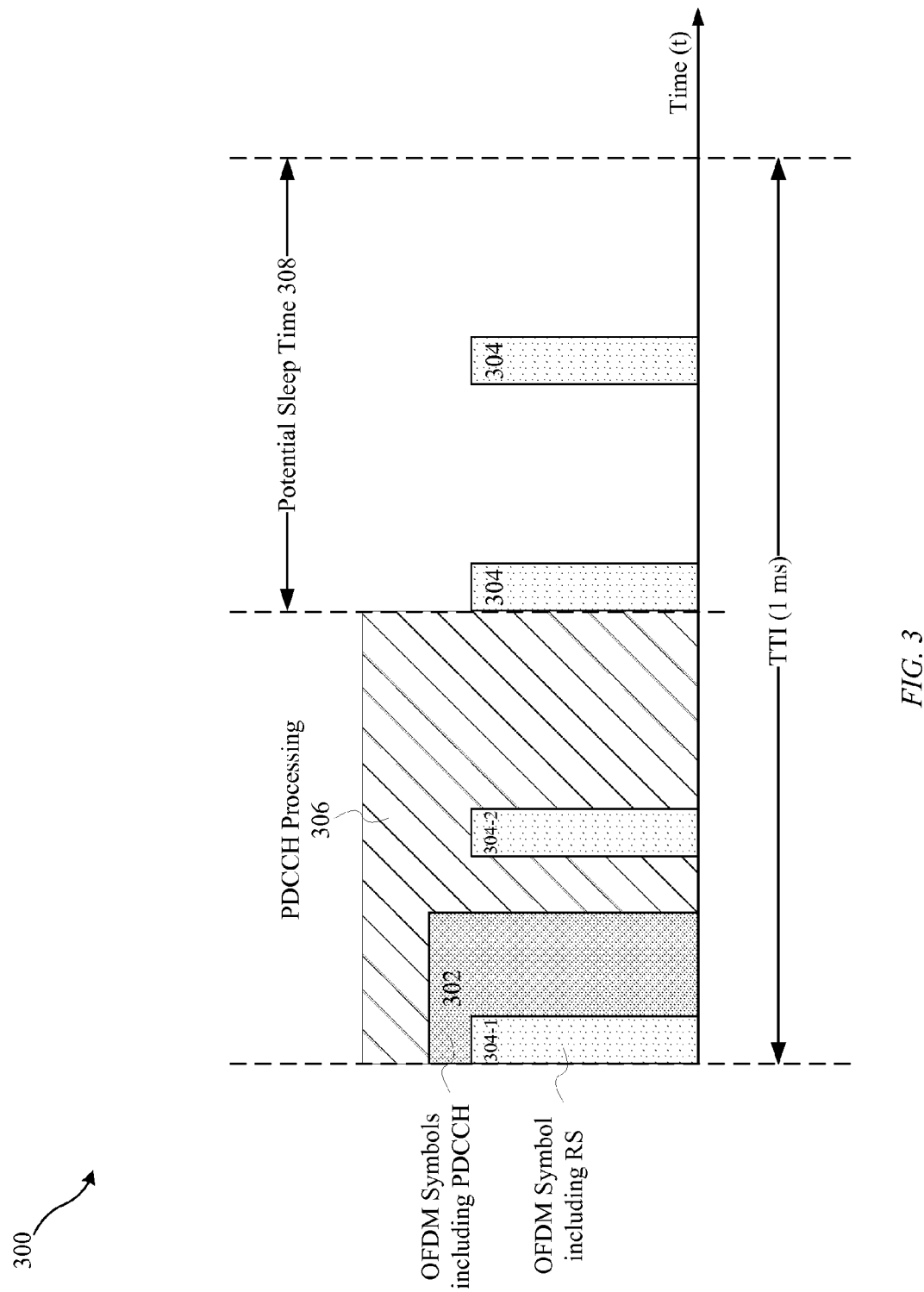
FIG. 3 illustrates a first approach to PDCCH decoding using channel estimates derived from two OFDM symbols, in accordance with some embodiments.

FIG. 3 illustrates a first approach to PDCCH decoding. The approach illustrated in FIG. 3 may achieve a higher level of accuracy by using RS resource elements in multiple OFDM symbols but may also require a longer convergence rate. In the example of FIG. 3, a subframe can span a TTI of one ms and can include four distinct OFDM symbols 304 that include RS resource elements. The PDCCH may occupy a contiguous set of OFDM symbols represented by the PDCCH OFDM symbol block 302. As can be seen in FIG. 3, the PDCCH OFDM symbol block 302 can include a first OFDM symbol 304-1 that contains RS resource elements and one or more "other" OFDM symbols that do not contain RS resource elements, e.g., such as illustrated in FIG. 1 where certain OFDM symbols include RS resource elements and other OFDM symbols do not include RS resource elements. In this regard, there can be two or more OFDM symbols in the PDCCH OFDM symbol block 302. However, the last OFDM symbol of the PDCCH OFDM symbol block 302 can occur before the second OFDM symbol 304-2 that contains RS resource elements. In order to achieve a higher level of accuracy, the approach illustrated in FIG. 3 can perform a channel estimate for each of OFDM symbol 304-1 and OFDM symbol 304-2 before demodulating any of the OFDM symbols 302 in the PDCCH OFDM symbol block 302. Each of the OFDM symbols of the PDCCH OFDM symbol block 302 is subsequently demodulated based on both a channel estimate based on OFDM symbol 304-1 and another channel estimate based on OFDM symbol 304-2. As such, demodulation of the PDCCH OFDM symbols 302 may not begin until after performing the channel estimate of the later OFDM symbol 304-2, and thus the amount of time taken for PDCCH processing 306 extends well beyond transmission of both the last OFDM symbol of the PDCCH OFDM symbol block 302 and transmission of OFDM symbol 304-2, thus reducing the available potential sleep time 308. Accordingly, while the approach of FIG. 3 can offer a high level of accuracy, increased latency (to generate results) and the additional time involved in PDCCH processing 306 can reduce time for powering down and conserving limited battery resources.

Figure 4:
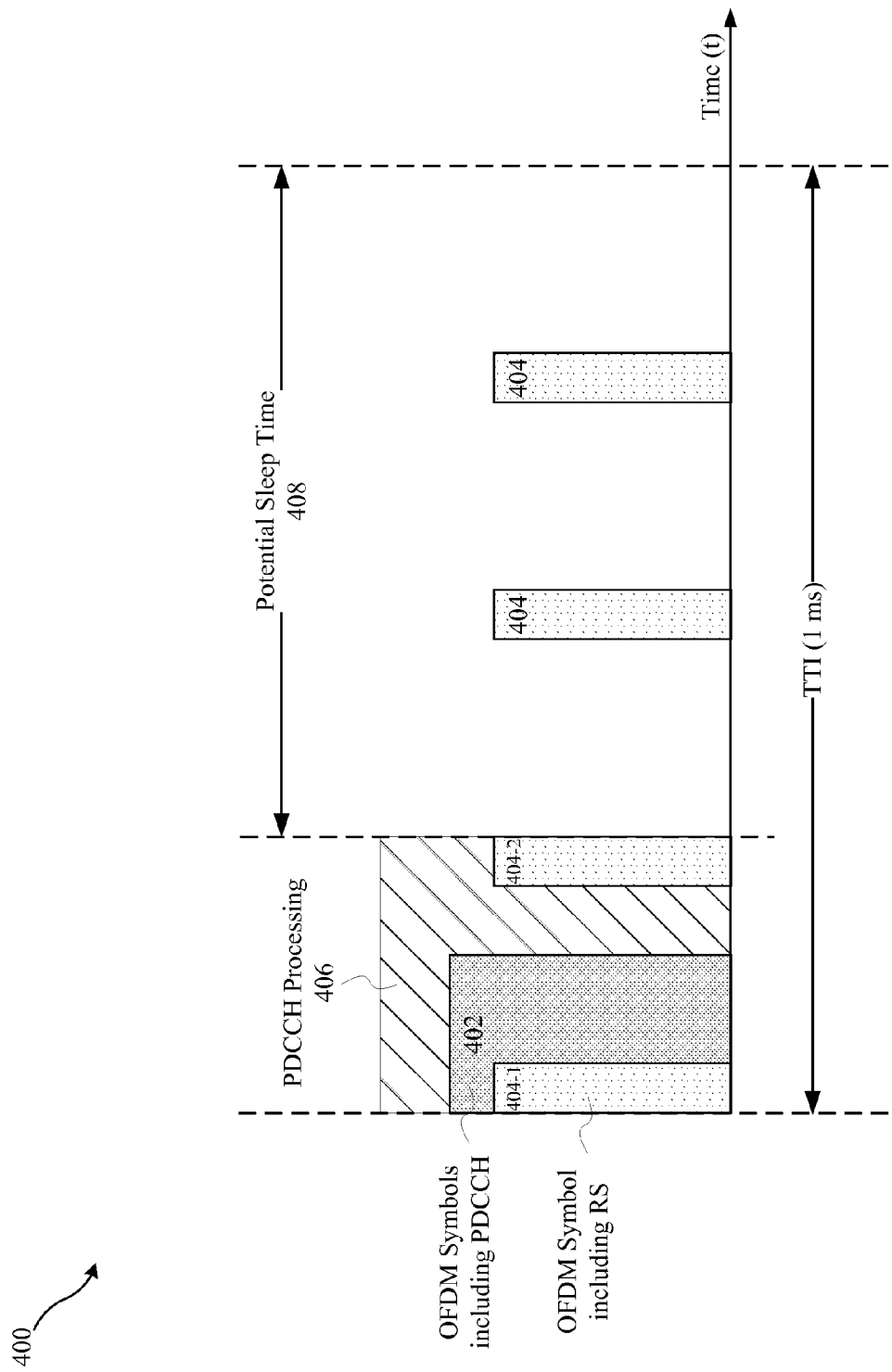
FIG. 4 illustrates a second approach to PDCCH decoding using channel estimates derived from one OFDM symbol, in accordance with some embodiments.

FIG. 4 illustrates a second approach to PDCCH decoding. The approach illustrated in FIG. 4 may achieve a more rapid convergence rate than the first approach illustrated in FIG. 3, thus enabling a longer potential sleep time after completing of the PDCCH processing, but may result in reduced accuracy of results in some instances, particularly when channel conditions change rapidly over time, and thus each OFDM symbol that includes RS resource elements may provide valuable "updated" information as channel conditions vary. As in the example of FIG. 3, a subframe can span a TTI of one ms, and can include four distinct OFDM symbols 404 that include RS resource elements. The PDCCH may occupy a set of OFDM symbols represented by the PDCCH OFDM symbol block 402. As can be seen in FIG. 4, the PDCCH OFDM symbol block 402 can include one or more OFDM symbols other than the first OFDM symbol 404-1 that contains RS resource elements. In this regard, the PDCCH OFDM symbol block 402 can include two or more OFDM symbols. As in the example of FIG. 3, the last OFDM symbol in the PDCCH OFDM symbol block 402 can occur before the second OFDM symbol 404-2, which contains RS resource elements.

In the approach illustrated in FIG. 4, the convergence rate length and latency for PDCCH processing 406 following the last OFDM symbol in the PDCCH OFDM symbol block 402 can be reduced by demodulating the OFDM symbols of the PDCCH OFDM symbol block 402 based only on a channel estimate performed based on the first OFDM symbol 404-1 that includes RS resource elements, without using time tracking based on performance of a channel estimate based on the second OFDM symbol 404-2 that also includes RS resource elements. Accordingly, demodulation of the OFDM symbols of the PDCCH OFDM symbol block 402 can begin as soon as the channel estimate based on the first OFDM symbol 404-1 completes without waiting to receive and perform channel estimation using the second OFDM symbol 404-2. Thus, as can be seen from a comparison of the approach in FIG. 3 and the approach in FIG. 4, the total time for PDCCH processing 406 is shorter and the PDCCH processing 406 completes earlier in than PDCCH processing 306 when using both the first OFDM symbol 404-1 and the second OFDM symbol 404-2. As such, a potential sleep time 408, when using the second approach illustrated in FIG. 4, is significantly greater than the potential sleep time 308, when using the first approach illustrated in FIG. 3. The lower latency resulting from PDCCH processing 406 using only one (or more generally fewer OFDM symbols that include RS resource elements) provides opportunity for power consumption savings compared to the approach in FIG. 3 that uses two (or more generally more OFDM symbols that include RS resource elements). Because PDCCH decoding in the second approach of FIG. 4 uses only on a single channel estimate, accuracy can be lower, however, particularly under more rapidly changing channel conditions.

In some embodiments, an improved approach to PDCCH decoding can balance between accuracy and convergence rate and offer reduced latency and convergence rate compared to the first approach illustrated in FIG. 3, while also offering higher accuracy than the second approach illustrated FIG. 4. In this regard, some embodiments parallelize PDCCH demodulation with channel estimation in order to reduce the latency and improve accuracy. More particularly, in instances in which multiple PDCCH OFDM symbols are present in a subframe, some embodiments demodulate a first set of one or more PDCCH OFDM symbols contained in the subframe based on a first channel estimate determined based on a first OFDM symbol that contains RS resource elements in the subframe without waiting to perform a second channel estimate based on a subsequent OFDM symbol that contains additional RS resource elements in the subframe. A second set of one or more PDCCH OFDM symbols contained in the subframe can be demodulated based on a combined channel estimate that is based on both the first channel estimate obtained from the first OFDM symbol that contains RS resource elements in the subframe and a second channel estimate obtained based on a second OFDM symbol that contains additional RS elements in the subframe. Accordingly, a convergence rate for algorithms that use the channel estimates can be improved by starting PDCCH demodulation of a first portion of the PDCCH OFDM symbols without waiting to obtain a second channel estimate, while accuracy can be maintained by using a second channel estimate when demodulating the second portion of the PDCCH OFDM symbols. Thus, the first set of PDCCH OFDM symbols are demodulated based on information in the first OFDM symbol that includes RS resource elements, while the second set of PDCCH OFDM symbols are demodulated based on information in the both the first OFDM symbol and the second OFDM symbol that each include RS resource elements.

Figure 5:
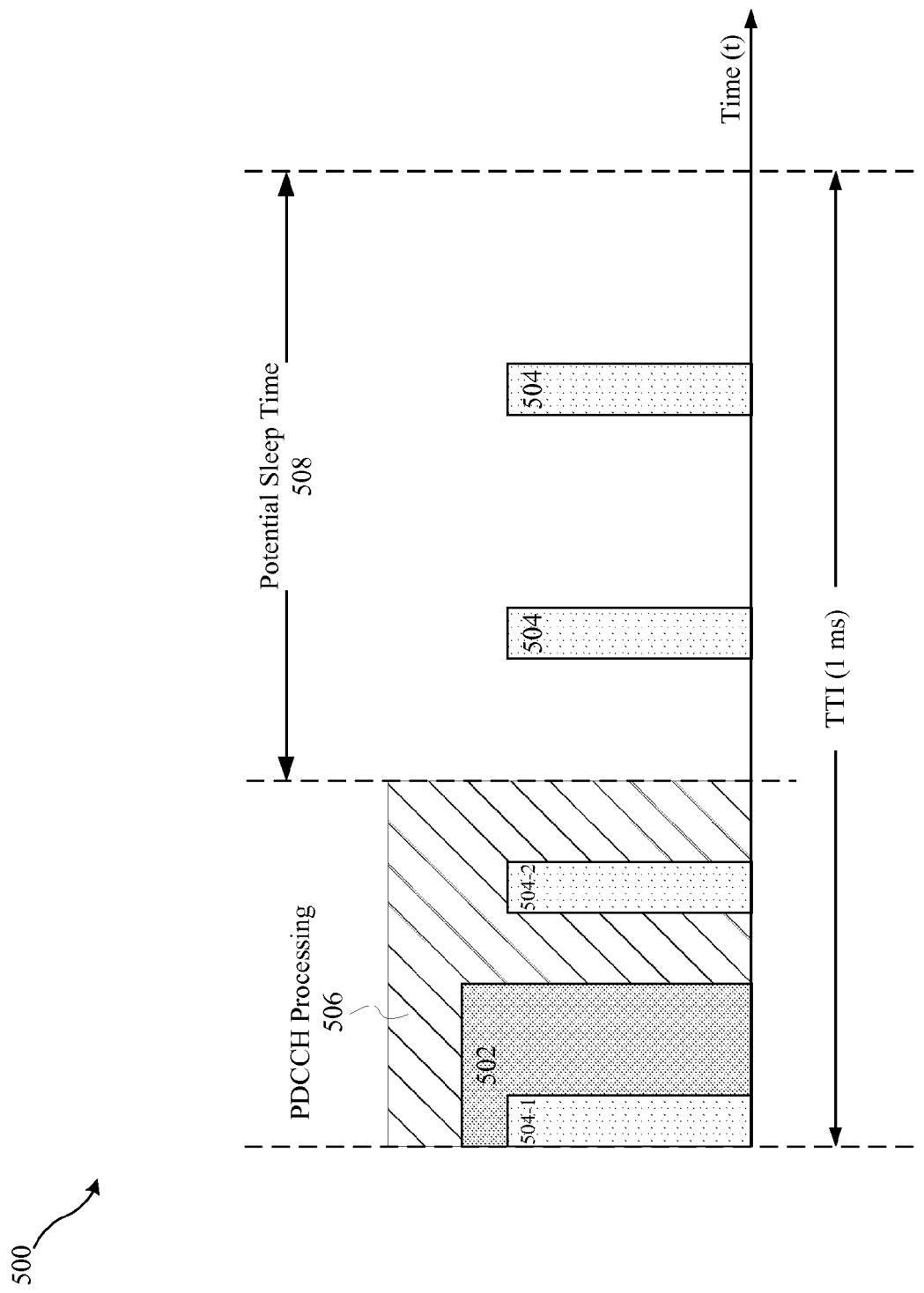
FIG. 5 illustrates a method for reducing resource consumption when performing PDCCH decoding based on a combination of channel estimates derived from multiple OFDM symbols, in accordance with some embodiments.

FIG. 5 illustrates a diagram 500 of a representative method to reduce resource consumption when decoding the PDCCH in accordance with some such embodiments. As in the examples of FIGS. 3 and 4, a subframe can span a TTI of one ms, and can include four distinct OFDM symbols 504 that each include RS elements. The PDCCH may occupy a set of OFDM symbols represented by the PDCCH OFDM symbol block 502. As can be seen in FIG. 5, the PDCCH OFDM symbol block 502 can include one or more OFDM symbols beyond the first OFDM symbol 504-1 that contains a first set of RS resource elements. In this regard, the PDCCH OFDM symbol block 502 can include two or more OFDM symbols, at least one of which can include RS resource elements and at least one of which does not include RS resource elements.

A first portion of the PDCCH OFDM symbols in the PDCCH OFDM symbol block 502 can be demodulated based on a channel estimate performed based on the first OFDM symbol 504-1 without waiting for receipt and channel estimation of the second OFDM symbol 504-2. A second portion of the PDCCH OFDM symbols 502 can be demodulated using a combined channel estimate based on both the channel estimate of the first OFDM symbol 504-1 and the channel estimate of the second OFDM symbol 504-2. For example, if there are two PDCCH OFDM symbols, the first PDCCH OFDM symbol can be demodulated based on the channel estimate obtained from the first OFDM symbol 504-1 prior to performing a channel estimate obtained based on the second OFDM symbol 504-2, and the second PDCCH OFDM symbol can be demodulated based on both the channel estimate obtained from the first OFDM symbol 504-1 and the channel estimate obtained from the second OFDM symbol 504-2. As a further example, if there are three PDCCH OFDM symbols, the first PDCCH OFDM symbol can be demodulated based on the channel estimate obtained based on the first OFDM symbol 504-1 prior to performing a channel estimate based on the second OFDM symbol 504-2, and the third PDCCH OFDM symbol can be demodulated based on both the channel estimate based on the first OFDM symbol 504-1 and the channel estimate based on the second OFDM symbol 504-2, while the second PDCCH OFDM symbol can be demodulated either based on the channel estimate obtained from the first OFDM symbol 504-1 or based on both the channel estimate obtained from the first OFDM symbol 504-1 and the channel estimate obtained from the second OFDM symbol 504-2.

As can be seen by comparing FIGS. 3, 4, and 5, the potential sleep time 508 available for the improved approach illustrated in FIG. 5 exceeds the potential sleep time 308 illustrated in the first approach of FIG. 3. In this regard, latency can be reduced, and the convergence rate can be improved by using the improved approached illustrated in FIG. 5 compared with the first approach illustrated in FIG. 3. The latency is reduced and convergence rate improved by demodulating a portion of the PDCCH OFDM symbols using a first channel estimate before waiting for additional RS resource elements to obtain a second channel estimate. Accuracy can improve by using the approach illustrated in FIG. 5 compared with the second approach illustrated in FIG. 4, as the device uses multiple channel estimates when demodulating a second set of OFDM symbol(s) that are part of the PDCCH OFDM symbol block 502 in the subframe, e.g., channel estimates from both the first OFDM symbol 504-1 and the second OFDM symbol 504-2.

Figure 6:
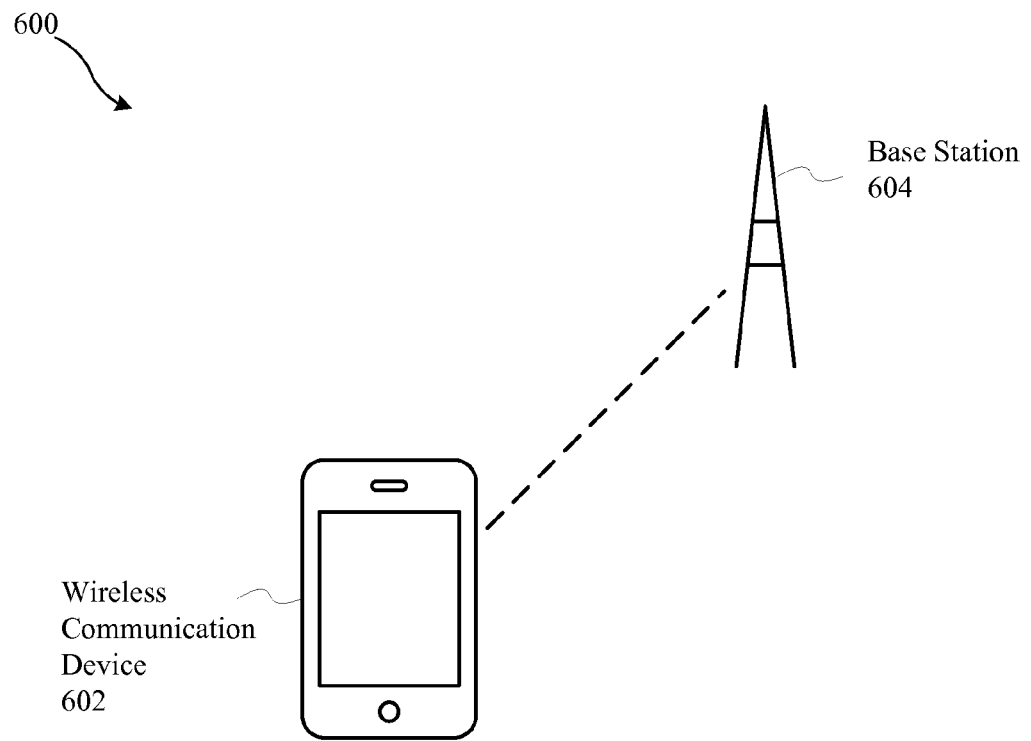
FIG. 6 illustrates a wireless communication system, in accordance with some embodiments.

FIG. 6 illustrates a diagram 600 of elements of a wireless communication system in accordance with some embodiments. The wireless communication system includes a wireless communication device 602. The wireless communication device 602 can include any computing device that can be configured to communicate over a wireless network, including, for example, a smart phone or other cellular phone, a tablet computing device, a laptop computing device configured to communicate over a cellular network, and/or the like. In some embodiments, such as embodiments in which the wireless communication system includes an LTE system that implements an LTE RAT, the wireless communication device 602 can be referred to as user equipment (UE). The wireless communication device 602 can also be referred to as a mobile device, a wireless device, a mobile wireless device, a mobile station, or other comparable terms.

The wireless communication device 602 can be camped on and/or otherwise receive signals transmitted by a base station 604. The base station 604 can be any type of cellular base station depending on a RAT type, including, for example, a base transceiver station (BTS), a node B, an evolved node B (eNB), or other cellular base station. In some example embodiments, the base station 604 can implement an LTE RAT, such as LTE, LTE-A and/or the like. The base station 604 can be configured to transmit, and the wireless communication device 602 to receive, a DL frame, such as, by way of example, the LTE DL frame 202 illustrated in and described with respect to FIG. 2, including one or more subframes containing one or more OFDM symbols that DCI and/or other control information. For example, in some embodiments, such as some embodiments in which the base station 604 is embodied as an eNB of an LTE system, the base station 604 can be configured to transmit, and the wireless communication device 602 to receive, a DL frame, such as the LTE DL frame 202 of FIG. 2, including at least one subframe that contains one or more OFDM symbols that contain a PDCCH.

It will be appreciated that various example embodiments are not limited to application in LTE systems. In this regard, embodiments and techniques described herein can be applied to any present or future RAT in which control information is included in OFDM symbols for which a wireless communication device can perform blind decoding. Thus, where techniques are described with respect to embodiments within LTE systems, it will be appreciated that these techniques can be applied mutatis mutandis to decoding control information in other RATs including control information within OFDM symbols of a downlink subframe within the scope of the disclosure. Furthermore, it will be appreciated that embodiments disclosed herein are not limited to decoding PDCCH. In this regard, techniques described herein can be applied mutatis mutandis to decoding other control channels that may be used in LTE and/or other RATs to carry control information within the scope of the disclosure.

Figure 7:
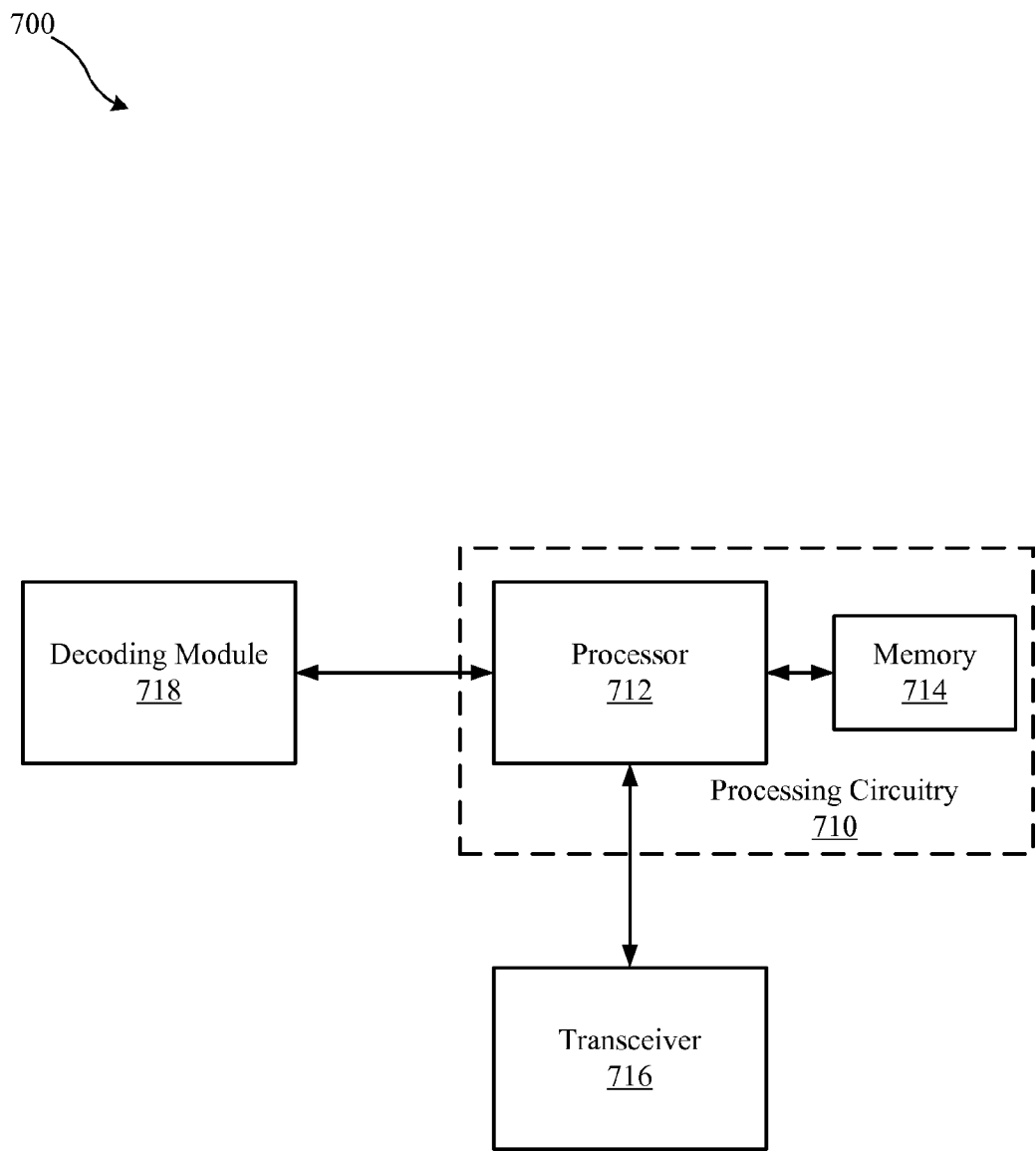
FIG. 7 illustrates a block diagram of an apparatus that can be implemented on a wireless communication device, in accordance with some embodiments.

FIG. 7 illustrates a block diagram of an apparatus 700 that can be implemented on wireless communication device 602 in accordance with some embodiments. In this regard, FIG. 7 illustrates an apparatus that can be configured to decode a control channel, such as the PDCCH in accordance with some embodiments. It will be appreciated that the components, devices or elements illustrated in and described with respect to FIG. 7 below may not be mandatory and thus some components, devices, or elements may be omitted in certain embodiments. Additionally, some embodiments can include further or different components, devices or elements beyond those illustrated in and described with respect to FIG. 7.

In some embodiments, the apparatus 700 can include processing circuitry 710 that is configurable to perform actions in accordance with one or more embodiments disclosed herein. In this regard, the processing circuitry 710 can be configured to perform and/or control performance of one or more functionalities of the apparatus 700 in accordance with various example embodiments, and thus can provide means for performing functionalities of the apparatus 700 in accordance with various example embodiments. The processing circuitry 710 can be configured to perform data processing, application execution, and/or other processing and management services according to one or more example embodiments.

In some embodiments, the apparatus 700 or portion(s) or component(s) thereof, such as the processing circuitry 710, can include one or more chipsets, which can each include one or more chips. The processing circuitry 710 and/or one or more further components of the apparatus 700 can therefore, in some instances, be configured to implement an embodiment on a chipset comprising one or more chips. In some example embodiments in which one or more components of the apparatus 700 are embodied as a chipset, the chipset can be capable of enabling a computing device to operate in the system 600 when implemented on or otherwise operably coupled to the computing device. Thus, for example, one or more components of the apparatus 700 can provide a chipset, such as a cellular baseband chipset, configured to enable a computing device to communicate using one or more cellular RATs.

In some embodiments, the processing circuitry 710 can include a processor 712 and, in some embodiments, such as that illustrated in FIG. 7, can further include memory 714. The processing circuitry 710 can be in communication with or otherwise control a transceiver 716 and/or decoding module 718.

The processor 712 can be embodied in a variety of forms. For example, the processor 712 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 712 can comprise a plurality of processors. The plurality of processors can be in operative communication with each other and can be collectively configured to perform one or more functionalities of the apparatus 700 as described herein. In some example embodiments, the processor 712 can be configured to execute instructions that can be stored in the memory 714 or that can be otherwise accessible to the processor 712. As such, whether configured by hardware or by a combination of hardware and software, the processor 712 can be capable of performing operations according to various embodiments while configured accordingly.

In some example embodiments, the memory 714 can include one or more memory devices. Memory 714 can include fixed and/or removable memory devices. In some embodiments, the memory 714 can provide a non-transitory computer-readable storage medium that can store computer program instructions that can be executed by the processor 712. In this regard, the memory 714 can be configured to store information, data, applications, instructions and/or the like for enabling the apparatus 700 to carry out various functions in accordance with one or more example embodiments. In some embodiments, the memory 714 can be in communication with one or more of the processor 712, transceiver 716, or decoding module 718 via a bus (or buses) for passing information among components of the apparatus 700.

The apparatus 700 can further include transceiver 716. The transceiver 716 can be configured to enable the apparatus 700 to transmit wireless signals and receive wireless signals in accordance with one or wireless networking technologies. As such, the transceiver 716 can enable the apparatus 700 to send signals to and receive signals from base station 604.

The apparatus 700 can further include decoding module 718. The decoding module 718 can be embodied as various means, such as circuitry, hardware, a computer program product comprising computer readable program instructions stored on a computer readable medium (for example, the memory 714) and executed by a processing device (for example, the processor 712), or some combination thereof. In some embodiments, the processor 712 (or the processing circuitry 710) can include, or otherwise control the decoding module 718. The decoding module 718 can be configured to decode a control channel containing control information, such as PDCCH in accordance with one or more example embodiments. For example, the decoding module 718 of some example embodiments can be configured to decode PDCCH in accordance with the methodology illustrated in and described herein, e.g., with respect to any of FIGS. 3, 4, and 5.

Figure 8:
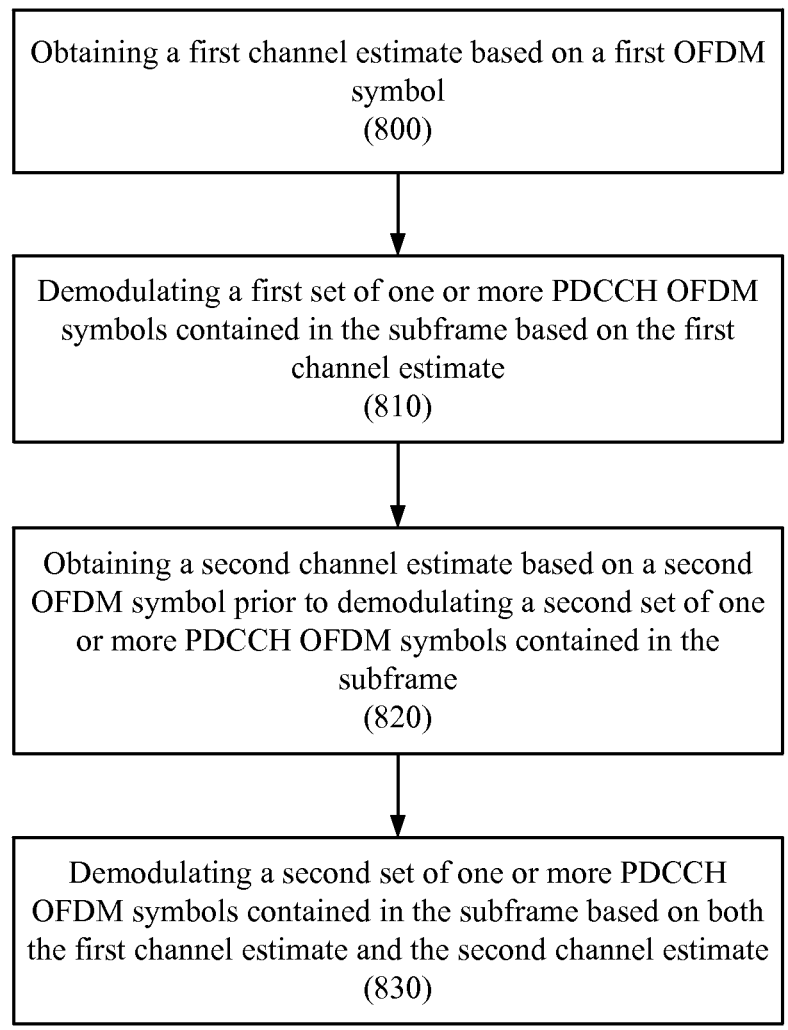
FIG. 8 illustrates a flowchart of a representative method to reduce resource consumption by a wireless communication device when performing PDCCH decoding, in accordance with some embodiments.

FIG. 8 illustrates a flowchart of a representative method to reduce resource consumption when decoding a control channel, e.g., the PDCCH, included within a subframe, in accordance with some embodiments. In this regard, FIG. 8 illustrates operations that can be performed by wireless communication device 602 in accordance with various embodiments. One or more of processing circuitry 710, processor 712, memory 714, transceiver 716, or decoding module 718 can, for example, provide means for performing the operations illustrated in and described with respect to FIG. 8.

Attendant to performance of FIG. 8, the wireless communication device 602 can receive a downlink subframe that includes two or more OFDM symbols that include control channel information, e.g., the PDCCH. The downlink subframe can, for example, be structured as shown (or similar to as shown) in the example of FIG. 2. It will be appreciated, however, that other subframe structures are contemplated within the scope of the disclosure.

Operation 800 can include the wireless communication device 602 obtaining a first channel estimate based on a first OFDM symbol of the two or more OFDM symbols. The first OFDM symbol can be a first OFDM symbol that contains RS resource elements within the subframe. For example, in some embodiments, such as embodiments implemented within LTE systems, operation 800 can include obtaining a channel estimate based on OFDM symbol #0 of a subframe (e.g., OFDM symbol #0 within the first time slot of the subframe).

Operation 810 can include the wireless communication device 602 demodulating a first set of one or more PDCCH OFDM symbols contained in the subframe based on the obtained first channel estimate. The first set of one or more PDCCH OFDM symbols can include a first OFDM symbol that includes the PDCCH within the subframe. For example, in some embodiments in which the PDCCH is included within OFDM symbol #0 of the subframe (e.g., OFDM symbol #0 within the first time slot of the subframe), operation 810 can include demodulating the PDCCH included in OFDM symbol #0. Operation 810 can be initiated and, in some instances, completed before obtaining a second channel estimate in operation 820. In this regard, performing channel estimation and PDCCH demodulation may be parallelized.

In some embodiments, operation 810 can include demodulating the first set of one or more PDCCH OFDM symbols further based on a channel estimate obtained from a prior subframe, in an instance in which such a channel estimate is available. In some embodiments, and in instances in which a channel estimate from the preceding subframe is not available, operation 810 can include demodulating the first set of one or more PDCCH OFDM symbols solely based on the channel estimate obtained in operation 800 based on the first OFDM symbol of the present subframe.

Operation 820 can include the wireless communication device 602 obtaining a second channel estimate based on a second OFDM symbol prior to demodulating a second set of one or more PDCCH OFDM symbols contained in the subframe. The second OFDM symbol used to obtain the second channel estimate can be the second OFDM symbol that contains RS resource elements within the subframe. For example, in some embodiments, such as embodiments implemented within LTE systems, operation 820 can include obtaining a channel estimate based on OFDM symbol #4 of the subframe (e.g., OFDM symbol #4 within the first time slot of the subframe).

Operation 830 can include the wireless communication device 602 demodulating a second set of one or more PDCCH OFDM symbols contained in the subframe based on both the first channel estimate and the second channel estimate. In this regard, the second set of one or more PDCCH OFDM symbols can be demodulated based on a combined channel estimate that can improve accuracy, particularly when the wireless communication device operates in channel conditions that vary substantially across different OFDM symbols of the subframe. The second set of one or more PDCCH OFDM symbols can include the last OFDM symbol that includes the PDCCH within the subframe. For example, in some embodiments in which the PDCCH is included within two OFDM symbols, such as OFDM symbol #0 and OFDM symbol #1 of the subframe (e.g., OFDM symbols #0 and #1 within the first time slot of the subframe), operation 830 can include demodulating the PDCCH included in OFDM symbol #1 based on both the first channel estimate and the second channel estimate.

In accordance with some embodiments, in instances in which the subframe includes three or more PDCCH OFDM symbols, each intermediate PDCCH OFDM symbol positioned between a first PDCCH OFDM symbol in the subframe and a last PDCCH OFDM symbol in the subframe can be demodulated based on the first channel estimate obtained in operation 810, or can be demodulated based on both the first channel estimate obtained in operation 810 and the second channel estimate obtained in operation 820. Thus, for example, in accordance with some embodiments, in instances in which a subframe contains three PDCCH OFDM symbols at OFDM symbols #0, #1, and #2, operation 810 can include demodulating the PDCCH in OFDM symbols #0 and #1 based on the first channel estimate obtained from the first OFDM symbol, e.g., OFDM symbol #0. An example application of such embodiments is illustrated in and described below with respect to FIG. 12. In some embodiments, in instances in which a subframe contains three PDCCH OFDM symbols at OFDM symbols #0, #1, and #2, demodulation of the PDCCH in OFDM symbol #1 and/or in OFDM symbol #2 can be performed based on a combined channel estimate in operation 830 rather than being performed in operation 810 based solely on the first channel estimate obtained in operation 800. An example application of such embodiments is illustrated in and described below with respect to FIG. 13.

In some embodiments, the wireless communication device 602 can enter a reduced power consumption state for a remaining portion of the subframe following completion of operation 830, e.g., after completing PDCCH decoding, in an instance in which the wireless communication device 602 determines from decoding the PDCCH that a downlink assignment has not been assigned to the wireless communication device 602 for the subframe.

Figure 9:
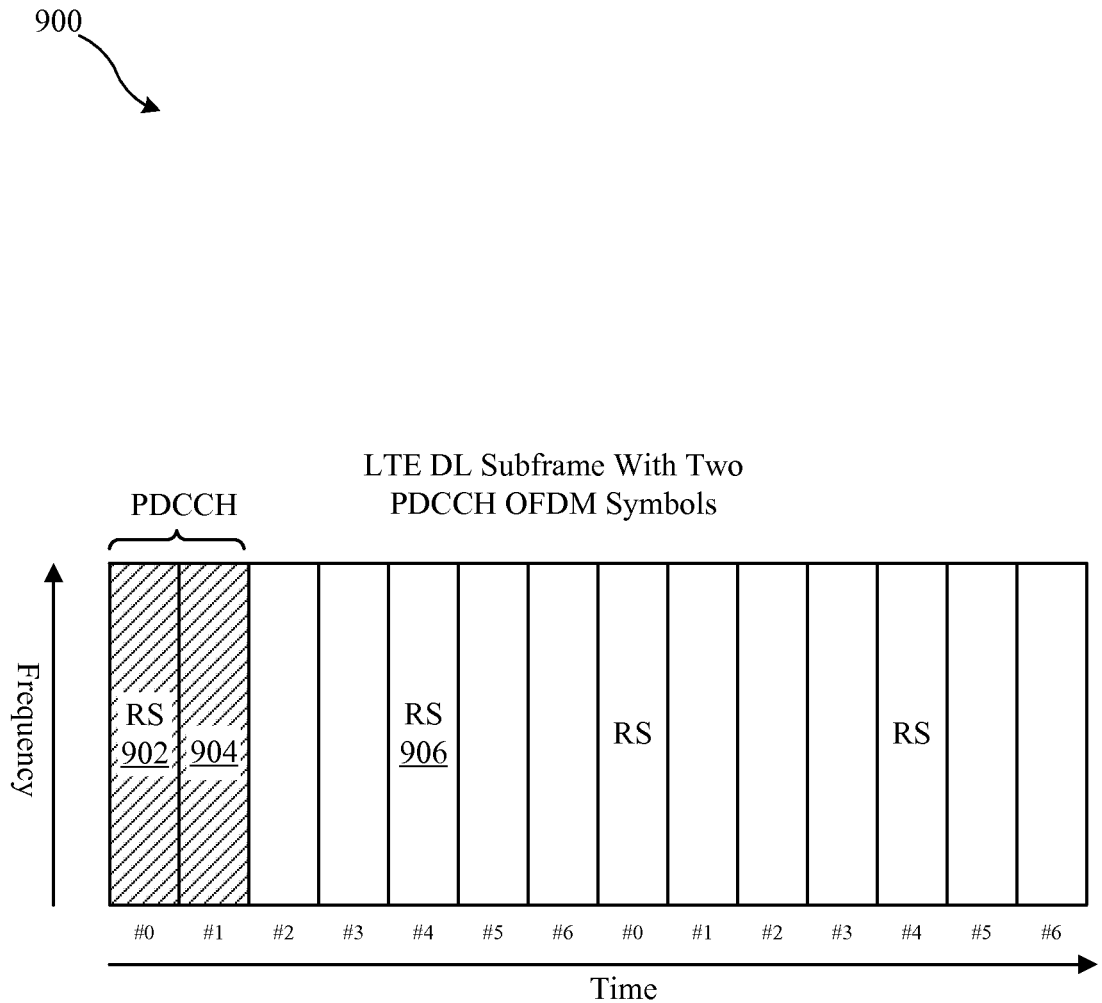
FIG. 9 illustrates a representative LTE DL subframe that contains two distinct PDCCH OFDM symbols, in accordance with some embodiments.

FIG. 9 illustrates an example LTE DL subframe 900 that contains two PDCCH OFDM symbols in accordance with some embodiments. In this regard, the PDCCH can be included in the first two OFDM symbols, namely OFDM symbol #0 (also labeled as 902) and OFDM symbol #1 (also labeled as 904) of the subframe 900. Channel estimation based on RS resource elements included in the first OFDM symbol can be performed, e.g., based on the RS resource elements included in OFDM symbol #0 902, and channel estimation can also be performed based on RS resource elements included in a subsequent OFDM symbol, e.g., using OFDM symbol #4 (also labeled as 906) of the subframe 900.

Figure 10:
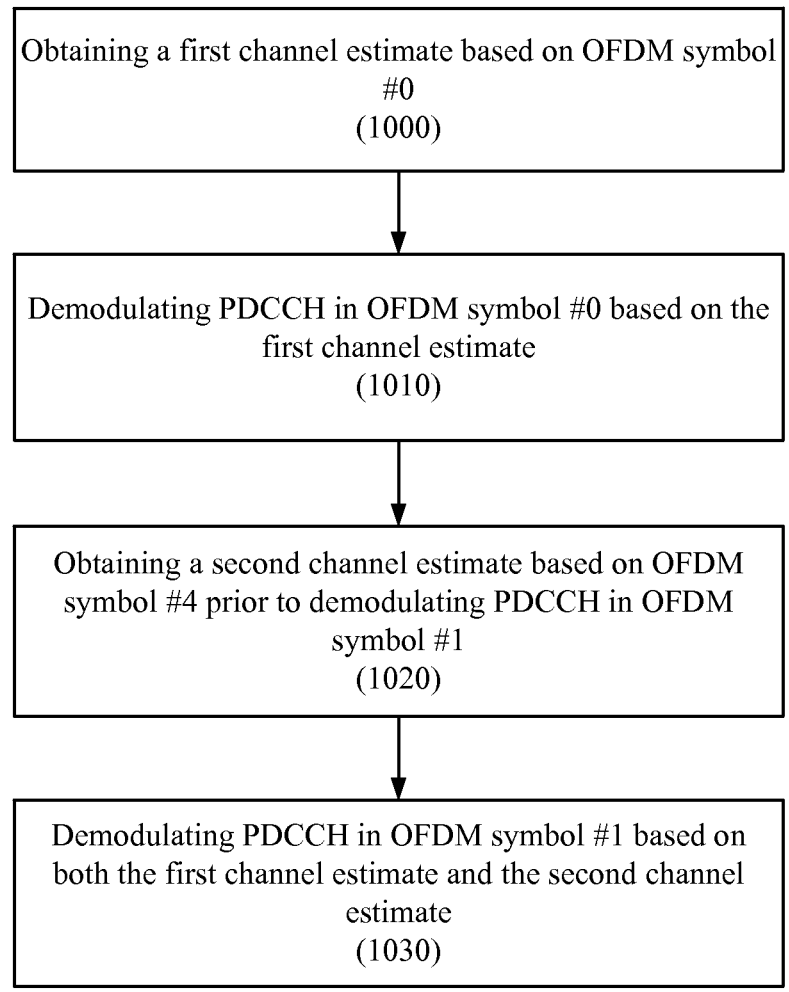
FIG. 10 illustrates a flowchart of a representative method to reduce resource consumption by a wireless communication device when decoding PDCCH for an LTE DL subframe that contains two PDCCH OFDM symbols, in accordance with some embodiments.

FIG. 10 illustrates a flowchart of an example method for reducing resource consumption when decoding a control channel, e.g., the PDCCH, in an LTE DL subframe that contains two PDCCH OFDM symbols, in accordance with some embodiments. In this regard, FIG. 10 illustrates operations that can be performed by the wireless communication device 602 to decode the PDCCH contained in the subframe 900 in accordance with some embodiments. One or more of processing circuitry 710, processor 712, memory 714, transceiver 716, or decoding module 718 can, for example, provide means for performing the operations illustrated in and described with respect to FIG. 10.

Operation 1000 can include the wireless communication device 602 obtaining a first channel estimate based on OFDM symbol #0 (also labeled 902 in FIG. 9), e.g., based on RS resource elements included in OFDM symbol #0 902. Operation 1010 can include the wireless communication device 602 demodulating PDCCH included in OFDM symbol #0 902 based on the first channel estimate. Operation 1010 can be initiated and, in some instances, completed prior to performing the second channel estimate of operation 1020. In this regard, performance of channel estimation and PDCCH demodulation may be parallelized.

In some example embodiments, operation 1010 can include demodulating PDCCH included in OFDM symbol #0 902 further based on a channel estimate from a prior subframe in an instance in which such a channel estimate is available. However, in some embodiments, and in instances in which a channel estimate from the preceding subframe is not available, operation 1010 can include demodulating OFDM symbol #0 902 solely based on the channel estimate performed in operation 1000.

Operation 1020 can include the wireless communication device 602 performing a second channel estimate based on OFDM symbol #4 906 prior to demodulating PDCCH in OFDM symbol #1 904.

Operation 1030 can include the wireless communication device 602 demodulating PDCCH included in OFDM symbol #1 904 based on both the first channel estimate and the second channel estimate.

In some example embodiments, the wireless communication device 602 can enter a reduced power consumption state for a remaining portion of the subframe 900 following completion of operation 1030 in an instance in which the wireless communication device 602 determines from decoding the PDCCH that a downlink assignment has not been assigned to the wireless communication device 602 for the subframe 900.

Figure 11:
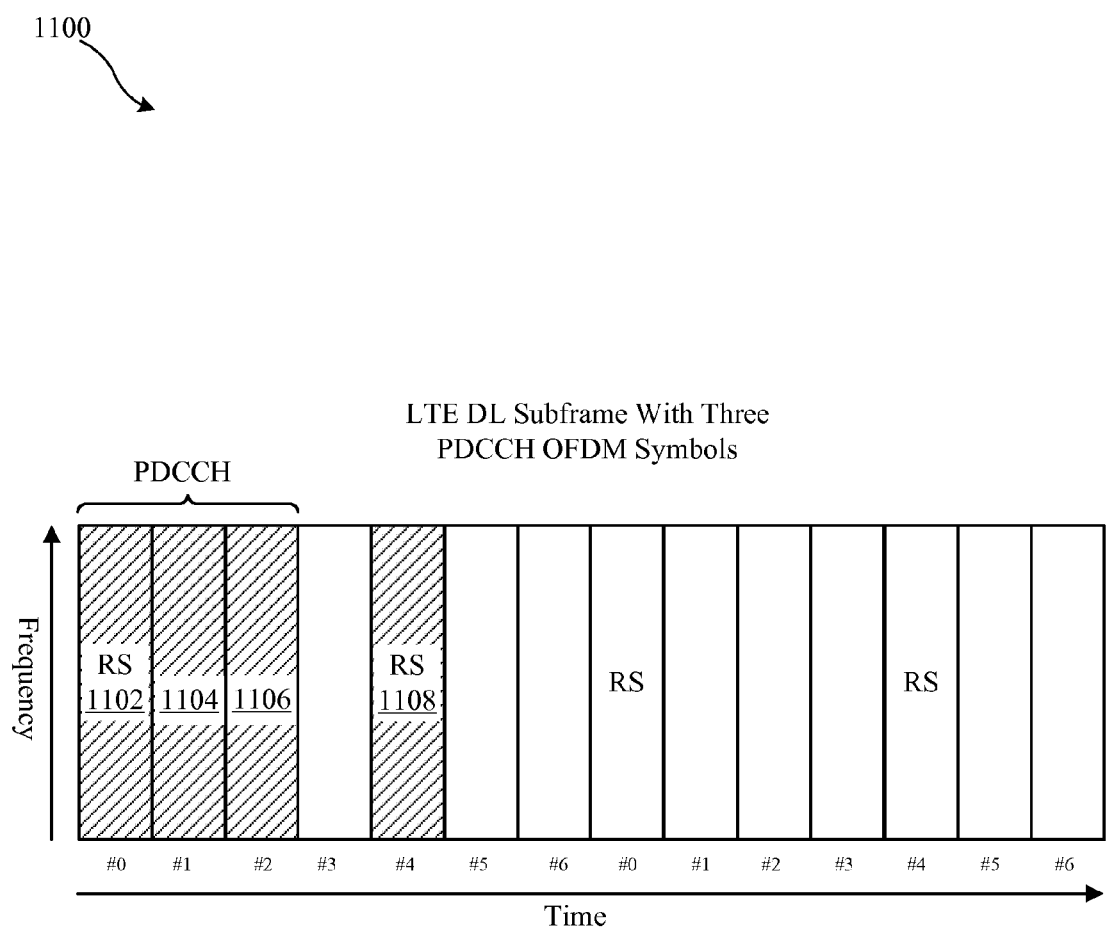
FIG. 11 illustrates a representative LTE DL subframe that contains three PDCCH OFDM symbols, in accordance with some embodiments.

FIG. 11 illustrates an example LTE DL subframe 1100 containing three PDCCH OFDM symbols in accordance with some example embodiments. In this regard, PDCCH can be included in the first three OFDM symbols, namely OFDM symbol #0 1102, OFDM symbol #1 1104, and OFDM symbol #2 1106, of the subframe 1100. RS symbols, based upon which channel estimation can be performed, can be included in OFDM symbol #0 1102 and OFDM symbol #4 1108 of the subframe 1100.

Figure 12:
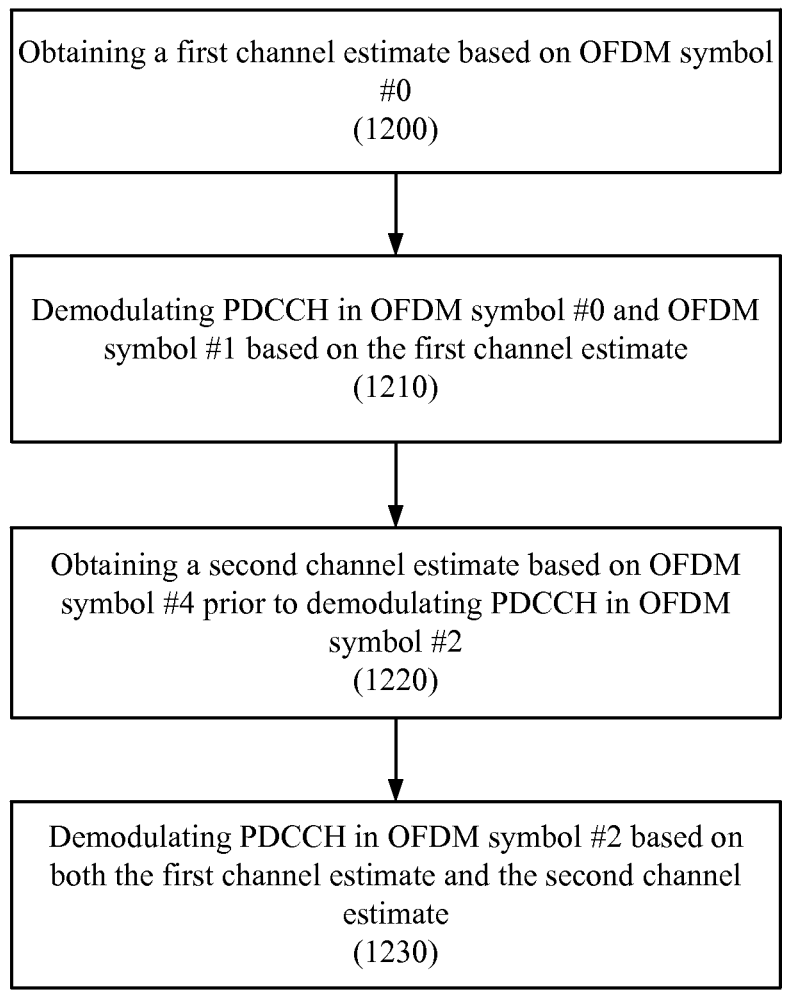
FIG. 12 illustrates a flowchart of a representative method to reduce resource consumption by a wireless communication device when decoding PDCCH symbols of an LTE DL subframe that contains three PDCCH OFDM symbols, in accordance with some embodiments.

FIG. 12 illustrates a flowchart of an example method for reducing resource consumption when decoding PDCCH in an LTE DL subframe containing three PDCCH OFDM symbols in accordance with some example embodiments. In this regard, FIG. 12 illustrates operations that can be performed by wireless communication device 602 to decode PDCCH contained in the subframe 1100 in accordance with some example embodiments. One or more of processing circuitry 710, processor 712, memory 714, transceiver 716, or decoding module 718 can, for example, provide means for performing the operations illustrated in and described with respect to FIG. 12.

Operation 1200 can include the wireless communication device 602 obtaining a first channel estimate based on a first OFDM symbol, e.g., OFDM symbol #0 (also labeled as 1102 in FIG. 11), e.g., the channel estimate obtained based on RS resource elements included in OFDM symbol #0 1102. Operation 1210 can include the wireless communication device 602 demodulating a control channel, e.g., the PDCCH, included in the first OFDM symbol, e.g., in OFDM symbol #0 1102, and in a second OFDM symbol, e.g., OFDM symbol #1 1104, based on the first channel estimate. Operation 1210 can be initiated and, in some instances, completed prior to obtaining a second channel estimate in operation 1220. In this regard, performance of channel estimation and PDCCH demodulation may be parallelized.

In some embodiments, operation 1210 can include demodulating the PDCCH included in OFDM symbol #0 1102 and/or OFDM symbol #1 1104 further based on a channel estimate obtained based on information included in or obtained during processing of a prior subframe, in an instance in which such a channel estimate is available. In some embodiments, however, and in instances in which a channel estimate from a prior subframe, such as from the preceding subframe, is not available, operation 1210 can include demodulating OFDM symbol #0 1102 and OFDM symbol #1 1104 solely based on the channel estimate obtain in operation 1200 based on OFDM symbol #0.

Operation 1220 can include the wireless communication device 602 obtaining a second channel estimate based on a second OFDM symbol that includes RS resource elements, e.g., OFDM symbol #4 1108, prior to demodulating the PDCCH in OFDM symbol #2 1106. Operation 1230 can include the wireless communication device 602 demodulating the PDCCH included in OFDM symbol #2 1106 based on both the first channel estimate and the second channel estimate.

In some embodiments, the wireless communication device 602 can enter a reduced power consumption state for a remaining portion of the subframe 1100 after completing the operation 1230, e.g., in an instance in which the wireless communication device 602 determines from decoding the PDCCH that a downlink assignment has not been assigned to the wireless communication device 602 for the subframe 1100. In some embodiments, the wireless communication device 602 determines whether downlink data may be received, e.g., based on information for DL assignments received in the PDCCH, and/or whether uplink data may be scheduled, e.g., based on information for UL assignments received in the PDCCH, and when no DL data or UL data will be received from the wireless network or transmitted to the wireless network, enter a power reduced state until a subsequent subframe in which new control information can be received.

Figure 13:
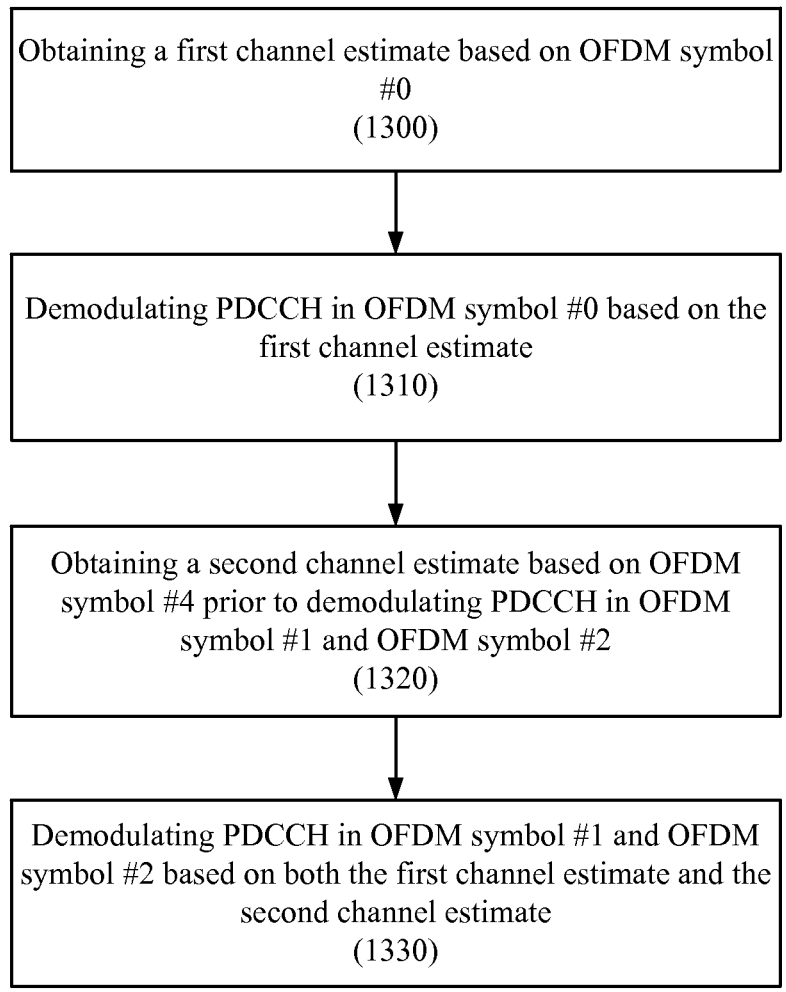
FIG. 13 illustrates a flowchart of another representative method to reduce resource consumption by a wireless communication device when decoding PDCCH symbols of an LTE DL subframe that contains three PDCCH OFDM symbols, in accordance with some embodiments.

FIG. 13 illustrates a flowchart of another representative method to reduce resource consumption by a wireless device when decoding the PDCCH in an LTE DL subframe that includes three PDCCH OFDM symbols, in accordance with some embodiments. In this regard, FIG. 13 illustrates operations that can be performed by wireless communication device 602 to decode the PDCCH contained in the subframe 1100, in accordance with some embodiments. One or more of processing circuitry 710, processor 712, memory 714, transceiver 716, or decoding module 718 can, for example, provide means for performing the operations illustrated in and described with respect to FIG. 13.

Operation 1300 can include the wireless communication device 602 obtaining a first channel estimate based on OFDM symbol #0 1102 (e.g., based on RS resource elements included in OFDM symbol #0 1102). Operation 1310 can include the wireless communication device 602 demodulating the PDCCH included in OFDM symbol #0 1102 based on the first channel estimate. Operation 1310 can be initiated and, in some instances, completed prior to obtaining a second channel estimate as part of operation 1320. In this regard, performance of channel estimation and PDCCH demodulation may be parallelized.

In some embodiments, operation 1310 can include demodulating the PDCCH included in OFDM symbol #0 1102 further based on a channel estimate obtained using information from a prior subframe, and/or a channel estimate obtained during the prior subframe, e.g., in an instance in which such a channel estimate is available. In some embodiments, however, and in instances in which a channel estimate from the preceding subframe is not available, operation 1310 can include demodulating OFDM symbol #0 1102 solely based on the channel estimate obtained in operation 1300.

Operation 1320 can include the wireless communication device 602 obtaining a second channel estimate based on OFDM symbol #4 1108 before demodulating the PDCCH in OFDM symbol #1 1104 and OFDM symbol #2 1106. Operation 1330 can include the wireless communication device 602 demodulating the PDCCH included in OFDM symbol #1 1104 and OFDM symbol #2 1106 based on both the first channel estimate and the second channel estimate.

In some embodiments, the wireless communication device 602 can enter a reduced power consumption state for a remaining portion of the subframe 1100 after completing the operation 1330, e.g., in an instance in which the wireless communication device 602 determines from decoding the PDCCH that a downlink assignment has not been assigned to the wireless communication device 602 for the subframe 1100.

In some embodiments, PDCCH decoding in accordance with one or more example embodiments, such as the methods of FIG. 8, FIG. 10, FIG. 12, and/or FIG. 13, can be performed for each of a plurality of antennas in parallel. In this regard, a wireless communication device, such as wireless communication device 602 that uses MIMO techniques, such as described with respect to FIG. 1, can decode the PDCCH for multiple antennas in parallel, in accordance with some embodiments.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method to reduce resource consumption by a wireless communication device when decoding a physical downlink control channel (PDCCH) in a subframe, the method comprising:
at the wireless communication device:
obtaining a first channel estimate based on a first orthogonal frequency-division multiplexing (OFDM) symbol of the subframe;
demodulating a first set of one or more PDCCH OFDM symbols contained in the subframe based on the first channel estimate;
obtaining a second channel estimate based on a second OFDM symbol of the subframe before demodulating a second set of one or more PDCCH OFDM symbols contained in the subframe; and
demodulating the second set of one or more PDCCH OFDM symbols based on both the first channel estimate and the second channel estimate.

2. The method of claim 1, wherein the subframe includes three PDCCH OFDM symbols and at least two OFDM symbols that include reference signals for channel estimation, and wherein:
obtaining the first channel estimate based on the first OFDM symbol of the subframe comprises obtaining the first channel estimate based on a first OFDM symbol that includes reference signals and begins the subframe;
demodulating the first set of one or more PDCCH OFDM symbols comprises demodulating the PDCCH included in the first OFDM symbol of the subframe based on the first channel estimate;
obtaining the second channel estimate based on the second OFDM symbol of the subframe comprises obtaining the second channel estimate based on a second OFDM symbol that includes reference signals of the subframe and is separated from the first OFDM symbol that begins the subframe by at least one intervening OFDM symbol; and
demodulating the second set of one or more PDCCH OFDM symbols comprises demodulating the PDCCH included in an OFDM symbol of the subframe that immediately follows the first OFDM symbol of the subframe based on both the first channel estimate and the second channel estimate.

3. The method of claim 1, wherein:
obtaining the first channel estimate based on the first OFDM symbol of the subframe comprises obtaining the first channel estimate based on an OFDM symbol #0 that begins the subframe;
demodulating the first set of one or more PDCCH OFDM symbols comprises demodulating the PDCCH included in the OFDM symbol #0 of the subframe based on the first channel estimate;
obtaining the second channel estimate based on the second OFDM symbol of the subframe comprises obtaining the second channel estimate based on an OFDM symbol #4 of the subframe; and
demodulating the second set of one or more PDCCH OFDM symbols comprises demodulating the PDCCH included in an OFDM symbol #2 of the subframe based on both the first channel estimate and the second channel estimate.

4. The method of claim 3, wherein:
demodulating the first set of one or more PDCCH OFDM symbols further comprises demodulating the PDCCH included in an OFDM symbol #1 of the subframe based on the first channel estimate before completing the obtaining of the second channel estimate.

5. The method of claim 3, wherein:
obtaining the second channel estimate based on the OFDM symbol #4 of the subframe occurs before demodulating the PDCCH included in an OFDM symbol #1 of the subframe; and
demodulating the second set of one or more PDCCH OFDM symbols further comprises demodulating the PDCCH included in the OFDM symbol #1 of the subframe based on both the first channel estimate and the second channel estimate.

6. The method of claim 1, further comprising:
by the wireless communication device:
determining, based on information in the PDCCH demodulated for the subframe, whether any downlink (DL) assignments are assigned to the wireless communication device; and
entering a reduced power consumption state for a remaining portion of the subframe when no downlink (DL) assignments are assigned to the wireless communication device.

7. The method of claim 1, wherein demodulating the first set of one or more PDCCH symbols comprises demodulating the first set of one or more PDCCH OFDM symbols further based on a channel estimate obtained from one or more OFDM symbols that include reference signals of a previous subframe.

8. The method of claim 1, wherein the method is performed for each of a plurality of antennas implemented on the wireless communication device.

9. A mobile wireless device configurable for communication via a long term evolution (LTE) wireless network, the mobile wireless device comprising:
one or more processors; and a storage device storing executable instructions that, when executed by the one or more processors, cause the mobile wireless device to:
  obtain a channel format indicator (CFI) value for a subframe;
  obtain a first channel estimate based on a first OFDM symbol of the subframe, the first OFDM symbol comprising control channel information and reference signals;
  when the CFI value indicates that the subframe carries control channel information, demodulate the first OFDM symbol based on the first channel estimate;
  when the CFI value indicates more than one OFDM symbol of the subframe carries control channel information:
    obtain a second channel estimate based on a second OFDM symbol of the subframe, the second OFDM symbol comprising reference signals and user data,
    demodulate at least one OFDM symbol of the subframe that carries control information based on the first channel estimate, and
    demodulate at least one other OFDM symbol of the subframe that carries control channel information based on both the first channel estimate and the second channel estimate.

10. The mobile wireless device of claim 9, wherein the control channel information comprises a physical downlink control channel (PDCCH).

11. The mobile wireless device of claim 9, wherein the CFI value indicates three OFDM symbols of the subframe carry control channel information, and wherein the at least one OFDM symbol that carries control information demodulated based on the first channel estimate comprises the first OFDM symbol, and the at least one other OFDM symbol that carries control information demodulated based on the first channel estimate and the second channel estimate comprises a latest occurring OFDM symbol of the three OFDM symbols that carry control information for the subframe.

12. The mobile wireless device of claim 11, wherein the at least one OFDM symbol that carries control information demodulated based on the first channel estimate further comprises a second OFDM symbol that immediately follows the first OFDM symbol that begins the subframe.

13. The mobile wireless device of claim 11, wherein the at least one other OFDM symbol that carries control information demodulated based on the first channel estimate and the second channel estimate comprises a second OFDM symbol that immediately precedes the latest occurring OFDM symbol of the three OFDM symbols that carry control information for the subframe.

14. The mobile wireless device of claim 9, wherein the mobile wireless device comprises more than one antenna.

15. The mobile wireless device of claim 9, wherein the second OFDM symbol of the subframe used to obtain the second channel estimate is separated from the first OFDM symbol of the subframe used to obtain the first channel estimate by at least three intervening OFDM symbols.

16. The mobile wireless device of claim 9, wherein execution of the instructions further causes the mobile wireless device to:
  when the CFI value indicates more than one OFDM symbol of the subframe carries control channel information:
  demodulate the first OFDM symbol of the subframe and a second OFDM symbol that immediately follows the first OFDM symbol based on the first channel estimate before completing obtaining of the second channel estimate.

17. The mobile wireless device of claim 10, wherein execution of the instructions further causes the mobile wireless device to:
  determine, based on information in the PDCCH demodulated for the subframe, whether any downlink (DL) assignments are assigned to the mobile wireless device; and
  enter a reduced power consumption state for a remaining portion of the subframe when no downlink (DL) assignments are assigned to the mobile wireless device.

18. The mobile wireless device of claim 9, wherein execution of the instructions further causes the mobile wireless device to:
  (i) obtain the second channel estimate based on the second OFDM symbol of the subframe comprising reference signals and user data; and
  (ii) demodulate the at least one OFDM symbol of the subframe that carries control information based on the first channel estimate in parallel with obtaining the second channel estimate.

19. The mobile wireless device of claim 9, wherein execution of the instructions further causes the mobile wireless device to demodulate at least one OFDM symbol that carries control information in the subframe based on at least one channel estimate obtained in a previous subframe.

20. A non-transitory computer-readable medium storing executable instructions that, when executed by one or more processors of a mobile wireless device, cause the mobile wireless device to:
  determine a number of OFDM symbols of a subframe that carry control channel information;
  obtain a first channel estimate based on a first OFDM symbol of the subframe that carries reference signals; and
  when the determined number of OFDM symbols that carry control information exceeds one:
    demodulate the first OFDM symbol that carries control information based on the first channel estimate,
    obtain a second channel estimate based on a second OFDM symbol of the subframe that carries reference signals, and
    demodulate a second OFDM symbol that carries control information based on both the first channel estimate and the second channel estimate.

* * * * *